June 27, 1933.  M. LOUGHEAD  1,915,857
THREE-PIECE BRAKE SHOE
Filed Sept. 6, 1927   2 Sheets-Sheet 1

Inventor:
Malcolm Loughead
By: Williams, Bradbury,
McCaleb & Hinkle
Attys.

June 27, 1933.  M. LOUGHEAD  1,915,857
THREE-PIECE BRAKE SHOE
Filed Sept. 6, 1927  2 Sheets-Sheet 2
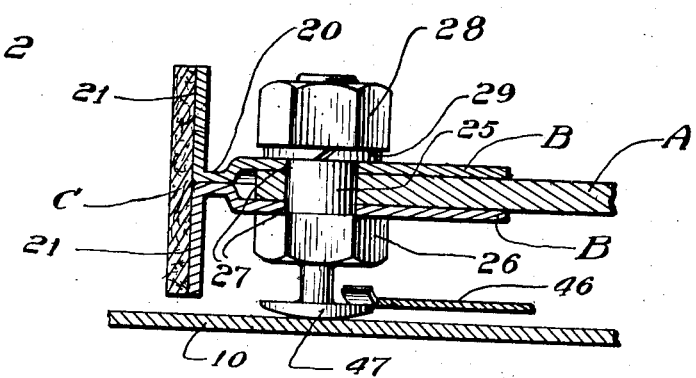
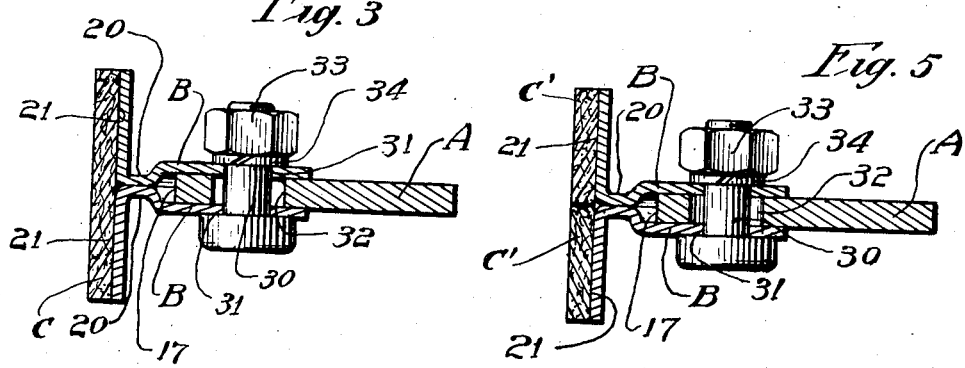
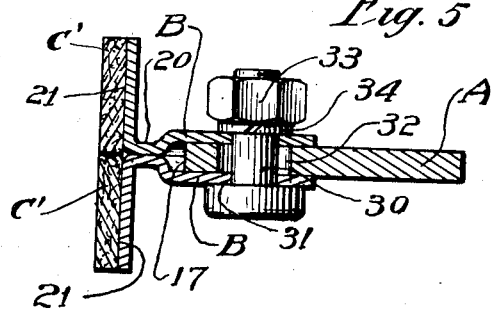
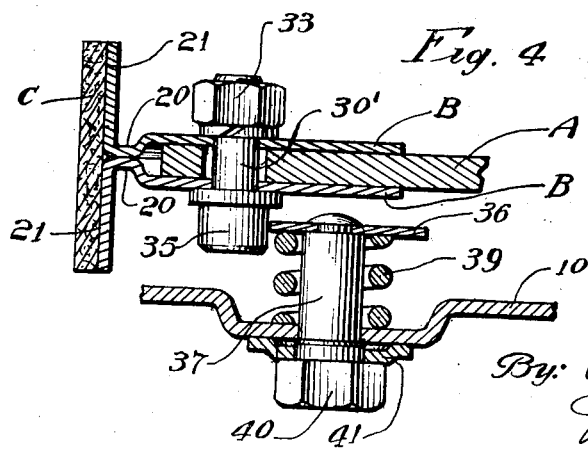
Inventor:
Malcolm Loughead
By: Williams, Bradbury,
McColeb + Hinkle
Attys.

Patented June 27, 1933

1,915,857

UNITED STATES PATENT OFFICE

MALCOLM LOUGHEAD, OF DETROIT, MICHIGAN, ASSIGNOR TO HYDRAULIC BRAKE COMPANY, OF DETROIT, MICHIGAN, A CORPORATION OF CALIFORNIA

THREE-PIECE BRAKE SHOE

Application filed September 6, 1927. Serial No. 217,582.

My invention relates to improvements in three-piece brake shoes.

The invention will be explained as embodied in a two-shoe hydraulic brake mechanism for motor vehicles.

An object of the invention is to provide an improved three-piece brake shoe.

A further object is to provide a three-piece brake shoe in which the brake lining elements of the shoe are capable of being forced into a true conformity with the drum when the shoe is assembled, thereby obviating the necessity of holding close tolerances between the arc of the shoe and the anchor pinhole or the close machining of the anchor pinhole in the shield.

A further object is to provide a three-piece brake shoe in which the brake lining supporting elements consist of two halves, each extending the full length of the effective part of the shoe, which are independent of each other until clamped into position so that each half may find its own location in the drum, thereby eliminating close tolerances on each of the half segments of the shoe.

A further object is to provide a three-piece brake shoe, the design of which affords minimum cost in manufacture.

Other objects and advantages will appear more fully from the following description and from the accompanying drawings, in which similar characters of reference indicate similar parts throughout the several views.

The invention is illustrated in the accompanying drawings forming a part of the application, in which Fig. 1 is a side elevation, partially in section, of a vehicle wheel brake mechanism embodying the three-piece shoes;

Fig. 2 is an enlarged sectional view along the line 2—2 of Fig. 1;

Fig. 3 is an enlarged sectional view along the line 3—3 of Fig. 1;

Fig. 4 is an enlarged sectional view along the line 4—4 of Fig. 1; and

Fig. 5 is a view similar to Fig. 3, illustrating a modified form of the shoe.

Figure 1:
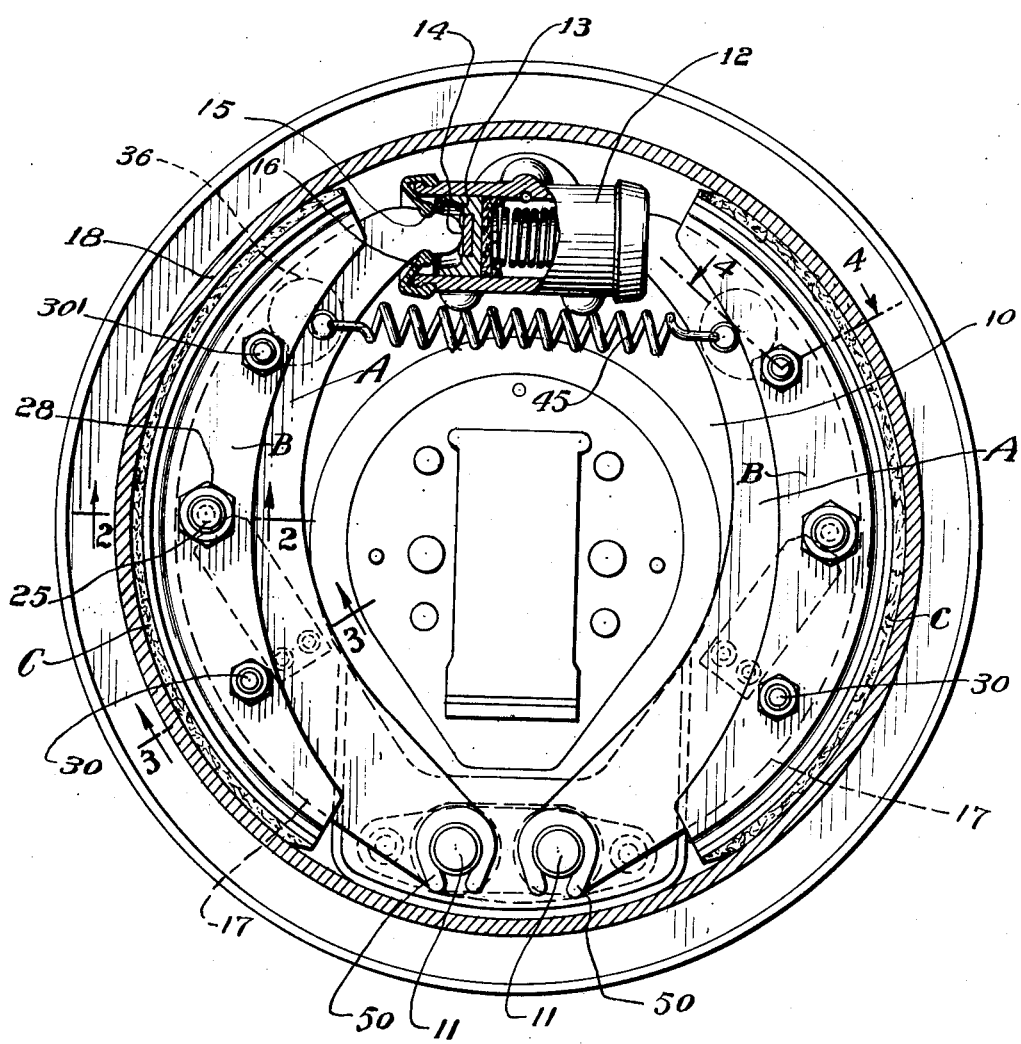

In general, my improved brake shoe consists of a plate A to which is secured a pair of cooperating segmental supporting members B for supporting brake lining C on the contiguous outer faces thereof.

In Fig. 1, I have illustrated the brake shoe as embodied in the ordinary type of hydraulic vehicle wheel brake consisting of a rear face plate or shield 10 to which brake shoe anchor pins 11 are secured and project laterally for mounting the plates A, and a hydraulic brake shoe actuating cylinder 12 having a pair of pistons, one of which may be seen at 13, which are operatively engaged with the free ends 14 of the plates A.

Adjacent to those portions of the plates which engage with the pistons 13 is provided a construction 15 over which a resilient sealing gland 16 is fitted which encompasses the adjacent end of the cylinder 12 so as to exclude dust and the like from the cylinders. In my prior Patent, No. 1,507,389, September 2, 1924, braking apparatus, is shown such mechanism as may be used for supplying fluid pressure for the cylinder 12 for the actuation of the brakes.

The plates A are of such contour as to present their outer edges 17 concentric with the brake drum 18 which is fixed to the vehicle wheel, not shown.

The segmental supporting members B are complementary in contour, one intended for engagement with each face of the plate A. Offset portions 20 of the segmental supporting members contact with one another at a point immediately beyond the outer edge 17 of the plate A. The outermost edges of the members B are bent laterally so as to form contiguous brake lining supporting surfaces 21 conforming in curvature to the brake drum 18. The brake lining C is secured to the supporting surfaces 21 by any well-known process, as in the case of the ordinary brake band lining.

A relatively large bolt 25 having a head 26 is projected through aligned openings 27 through the members B and plate A. These openings are of such size as to just permit the projection of the bolt 25 therethrough. A nut 28 and lock washer 29 are employed to securely hold the bolt in place and to bind the supporting members B into close engagement with the plate A.

A pair of bolts 30 and 30', smaller in size than the bolt 25, is disposed at opposite sides of the bolt 25 and at points midway between the bolt 25 and the ends of the supporting members B. The bolts 30 and 30' are projected through aligned openings 31 in the members B of a diameter just sufficient to permit the projection of the bolts therethrough and through a slot 32 in the plate A extending transverse to an intersecting radial line drawn from the bolt 25. Nuts 33 and lock washers 34 on the bolts 30 and 30' serve as means for drawing the adjacent portions of the supporting members B into close engagement with plate A and against movement thereto.

The bolt 30' nearest to the free end of the shoe has an elongated head 35 which performs the additional function of serving as a stop engaging member for the shoe. The stop with which the head 35 of the bolt 30' engages is adjustable and consists in a cam disc 36 secured to one end of a pillar 37 which is projected through the shield 10. A compression spring 39 is disposed between the disc 36 and the shield 10 concentric with the pillar 37. The pillar 37 has a head 40 to which is secured a member 41 which frictionally engages with the shield 10 so as to hold the pillar against rotation. Rotation of the pillar, as by turning the head 40, moves the cam disc 36 so as to limit the retractive movement of the shoe. The shape of the disc is important in compensating for heating of the brake drum and shoes. When the brake drum becomes heated due to friction with the shoes it expands and moves away from the shoes. As the heat from the drum is communicated to the shoes they also expand and become elongated, increasing the length of the shoes between anchor pins 11 and stop heads 35 with the result that the stop heads strike the cam disc at a point on the peripheries of the discs nearer to the drum. The slope of the cam discs is such that a slight elongation of the shoes will cause a considerable movement of the shoes toward the drum, and thereby maintain the amount of clearance between the shoes and the drum within permissible limits as the drum expands. This feature is very important in connection with hydraulically operated brakes, especially in systems of the type disclosed in the United States patent to Malcolm Loughead and Erwin F. Loweke, No. 1,758,671, issued May 13, 1930, in which the length of travel of the foot pedal depends upon the clearance between the shoes and the brake drum and when no means is provided to compensate for drum expansion the clearance may in some cases rise to such proportions as to require an extremely large pedal movement. It will be noted that the amount of movement of the shoes toward the drum depends not only upon the amount of elongation of the shoes but also upon the angle between the arcs of movement of the shoes and the slope of the discs at the points of contact of the stop heads on the shoes.

A tension spring 45 is connected at opposite ends with the plates A near the free ends of the plates and serves to normally maintain the shoes in their retractive position.

As my improved brake shoe is exceedingly light in construction, I have provided spring clips 46 which engage with buttons 47 formed integral with the head 26 of the bolts 25 which holds the shoes in fixed lateral position with respect to the shield 10.

In the initial installation of my improved three-piece brake shoe, the supporting members B are placed upon the plate A and bolts 25, 30 and 30' with their lock washers and nuts 28 and 33, respectively, and are fixed in place but not tightened. The plates A are then fitted over the anchor pins 11 and secured against dislodgment by lock plates 50 and the brake mechanism, including the cylinder 12 and pistons 13, is actuated to force the brake lining C against the drum 18. While the segmental supporting members B are thus urged toward the drum and therefore forced into conformity with the drum, the nuts 28 and 33 are tightened to their full extent. When fluid pressure is now relieved, the spring 45 will cause the brake shoes to move to retractive position and the shoes will maintain their proper conformity with the brake drum.

In like manner the bolts 28 and 33 may be loosened upon the wear of the brake lining to reestablish complete conformity between the segmental supports B, brake lining C and the drum 18. This is an unusual advantage not found in any present type of pivoted brake shoe.

In Fig. 5 I have shown a modified form of the invention which differs from that shown in the preceding figures only in the provision of a pair of parallel brake linings C', one for each of the brake lining's supporting surfaces 21 of the segmental supporting members B. The advantage obtained by this structure is that wear upon one side of the brake lining may be corrected without replacing the entire lining. Another advantage is that each side of the lining independently seeks its own engagement with the brake drum to provide maximum frictional engagement therewith.

I have discovered that so far with this type of articulated brake shoe it has been impossible to obtain a squeak which is a characteristic of the rigid type of brake shoe upon the application of the brakes. This is undoubtedly due to the fact that the articulated shoe does not vibrate as an entirety and when struck with a hammer or the like gives merely a dull thud.

Subject-matter disclosed but not claimed in this application is claimed in my continuing applications, Serial Nos. 557,983 and 557,984, filed August 19, 1931.

While I have illustrated and described a specific embodiment of my invention, many modifications may be made without departing from the spirit of the invention, and I do not wish to be limited to the precise details set forth but desire to avail myself of all changes within the scope of the appended claims.

Having thus described my invention, what I claim as new and desire to secure by Letters Patent of the United States is as follows:

1. An articulated brake shoe comprising a rigid plate adapted for pivotal support, a pair of separate cooperating segmental brake lining supporting members carried by the plate, and means for fixing the segmental members to the plate.

2. An articulated brake shoe comprising a rigid plate adapted for pivotal support, a pair of separate cooperating segmental brake lining supporting members carried by the plate, brake lining disposed upon the outer faces of the segmental members, and means for fixing the segmental members to the plate.

3. An articulated brake shoe comprising a rigid plate adapted at one end for pivotal support, said plate having its opposite end fashioned for engagement with a brake shoe operating mechanism, a pair of separate cooperating segmental brake lining supports carried by the plate, brake lining carried by the segmental members, and means for fixing the segmental members against movement with respect to the plate.

4. An articulated brake shoe comprising a rigid plate adapted at one end for pivotal support, said plate having its opposite end fashioned for engagement with a brake shoe operating mechanism, a pair of separate cooperating segmental brake lining supports carried by the plate, brake lining carried by the segmental members, and means for fixing the segmental members against movement with respect to the plate, said last named means being capable of manipulation to release the segmental members and fix the members with respect to the plate at will.

5. An articulated brake shoe comprising a rigid plate adapted for pivotal support, a pair of separate cooperating segmental brake lining supporting members, capable of yielding to the precise contour of the brake drum, and means for fixing the segmental members upon the plate when forced into registration with the brake drum and for maintaining them in fixed relation to the plate thereafter.

6. In combination a brake drum, brake shoe actuating means, a rigid plate pivotally supported at one end and having its other end engaged with said brake shoe actuating means, an articulated brake lining support capable of being forced into conformity with the brake drum, a brake lining disposed on said support, and means for fixing the articulated support against movement with respect to said plate.

7. In combination a brake drum, brake shoe actuating means, a rigid plate pivotally supported at one end and having its other end engaged with said brake shoe actuating means, an articulated brake lining support capable of being forced into conformity with the brake drum, an articulated brake lining disposed on said support, and means for fixing the articulated support against movement with respect to said plate.

8. A brake shoe comprising a rigid plate, means for pivotally supporting the plate at one end, an articulated brake lining support consisting of two longitudinally extending and laterally abutting members, a brake lining disposed upon said support, and means for fixing the support against movement with respect to the plate.

9. A brake mechanism comprising a rotatable brake drum, a stationary support, a shoe pivotally mounted on said support, a stop member carried by the shoe, a disc having a spirally shaped surface adapted to be engaged by the stop member, and means for adjusting the disc to fix the normal position of the shoe.

10. In a vehicle wheel brake, a brake drum, a relatively flexible brake lining support, means for applying radial pressure to the flexible support to cause the support to adjust itself to the curvature of the brake drum, a pivotally supported rigid member, means for locking a portion of the flexible support adjacent to its inner end to an adjacent part of the rigid member to retain said portion in its adjusted position, and means associated with the rigid member for pivotally mounting the flexible support within the drum.

11. A brake shoe comprising a pair of angle members each having a cylindrical flange and a radial flange, arranged back to back with the outer edges of the radial flanges spaced apart, a stiffening member in the space between said radial flanges and pivotally connected to said angle members, said angle members being movable relative to each other and to the stiffening member.

12. A brake shoe comprising, in combination, a pair of pressed metal angle members arranged to form a circumferential lining supporting surface and a pair of radial flanges extended in spaced relation to each other throughout the lining supporting surface, a radially extending stiffening member between said flanges extending circumferentially beyond said lining supporting surface, and bolts extending through the radial flanges and said stiffening member to hold the three members in assembled relation but permitting limited relative movement of each member.

13. A brake shoe comprising, in combination, a pair of angle members each having a cylindrical flange and a radial flange arranged back to back, said radial flanges engaging each other at points adjacent the cylindrical flanges and spaced apart adjacent their outer edges, a stiffening member between said radial flanges extending circumferentially beyond said cylindrical flanges, and means for pivotally connecting said stiffening member to said angle members.

14. A brake shoe comprising, in combination, a pair of angle members each having a cylindrical flange and a radial flange arranged back to back, said radial flanges engaging each other at points adjacent the cylindrical flanges and spaced apart adjacent their outer edges, a stiffening member between said radial flanges extending circumferentially beyond said cylindrical flanges, means for pivotally connecting said stiffening members to said angle members, and means for varying the frictional resistance between said members.

15. A brake shoe comprising a cylindrical lining supporting surface, a radially extending stiffening member pivotally connected to said lining supporting surface, and means for varying the friction resistance between said stiffening member and said lining support.

16. A brake shoe comprising a cylindrical lining support, a pair of spaced radial flanges on said support, a stiffening member pivoted between said radial flanges and extending circumferentially beyond the opposite ends of said lining support, and means for varying the frictional resistance between said stiffening member and said radial flanges.

17. A brake shoe of pressed metal having a cylindrical portion and spaced radial flanges formed by arranging two angle members back to back, and a member pivoted between said flanges and extending beyond the opposite ends of said cylindrical portion.

18. A brake shoe of pressed metal having a cylindrical portion and spaced radial flanges formed by arranging two angle members back to back, a member pivoted between said flanges and extending beyond the opposite ends of said cylindrical portion, and a brake lining secured to the outer periphery of the cylindrical portion on the two angle members.

19. A brake shoe comprising, in combination, a pair of angle members, each having a cylindrical flange and a radial flange arranged with the radial flanges spaced apart, a stiffening member in the space between said radial flanges, a pin extending through said flanges and said stiffening member adjacent the center thereof, and means spaced from said pin for varying the frictional resistance between said stiffening member and said radial flanges.

20. A brake shoe comprising, in combination, a pair of angle members, each having a cylindrical flange and a radial flange arranged with the radial flanges spaced apart, a stiffening member in the space between said radial flanges, a pin extending through said flanges and said stiffening member, adjacent the center thereof, pins at the opposite sides of said central pin extending through said flanges and said stiffening member, means on said last named pins to prevent relative movement thereof with respect to one of said members, but free for relative movement with the other of said members.

21. A brake shoe of pressed metal having a cylindrical lining supporting surface and spaced radial flanges formed by arranging two angle members back to back, a member pivoted between said flanges, and a brake lining secured to the outer periphery of the cylindrical portion on the two angle members.

In witness whereof, I hereunto subscribe my name this 31st day of August, 1927.

MALCOLM LOUGHEAD.